United States Patent
Kamezaki et al.

(10) Patent No.: US 6,866,910 B2
(45) Date of Patent: Mar. 15, 2005

(54) INFORMATION RECORDING MEDIUM

(75) Inventors: Hisamitsu Kamezaki, Kanagawa (JP); Ippei Ogawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/442,029

(22) Filed: May 20, 2003

(65) Prior Publication Data

US 2003/0224136 A1 Dec. 4, 2003

Related U.S. Application Data

(63) Continuation of application No. 10/174,207, filed on Jun. 18, 2002, now abandoned, which is a continuation of application No. 09/643,014, filed on Aug. 21, 2000, now abandoned.

(30) Foreign Application Priority Data

Aug. 20, 1999 (JP) .................................... 11-234095

(51) Int. Cl.⁷ ................................................ B32B 3/02
(52) U.S. Cl. ................ 428/64.1; 428/64.4; 430/270.11
(58) Field of Search ............................. 428/64.1, 64.4, 428/945; 430/270.11, 495.1, 945; 369/283, 288

(56) References Cited

U.S. PATENT DOCUMENTS

| | | |
|---|---|---|
| 4,827,469 A | 5/1989 | Peeters |
| 5,045,438 A | 9/1991 | Adachi ........................ 430/321 |
| 5,616,447 A * | 4/1997 | Arioka ................... 430/270.11 |
| 5,705,247 A * | 1/1998 | Arai et al. .................. 428/64.1 |

FOREIGN PATENT DOCUMENTS

| | | |
|---|---|---|
| EP | 0373763 | 6/1990 |
| EP | 0628956 | 12/1994 |
| EP | 1026686 | 8/2000 |
| EP | 1069556 | 1/2001 |
| JP | 06060589 | 3/1994 |
| JP | 08212595 | 8/1996 |
| JP | 08241540 | 9/1996 |
| JP | 2000357345 | 12/2000 |

* cited by examiner

*Primary Examiner*—Elizabeth Mulvaney
(74) *Attorney, Agent, or Firm*—Cooper & Dunham LLP

(57) ABSTRACT

An information recording medium including a transparent substrate, and a recording layer or a metallic layer formed on the transparent substrate directly or through an undercoat layer, with an amplitude attenuation time of 1 second or less and/or a vibration frequency attenuation time of 3 seconds or less, when vibrated in the direction perpendicular to the flat surface of said information recording medium, or wherein when the information recording medium is in-plane vibrated in the direction perpendicular to the extending direction of information recording, reproducing and/or deleting tracks, a maximum in-plane deviation of a recording, reproducing or deleting position in the tracks in the perpendicular direction from a correct recording, reproducing or deleting position in the tracks is 12.5×d or less wherein d is an average distance between the adjoining tracks measured in the direction perpendicular to the extending direction of the tracks, and an acceleration of the information recording medium in the perpendicular direction is 0.25 m/s² or less.

20 Claims, 7 Drawing Sheets

FIG. 9
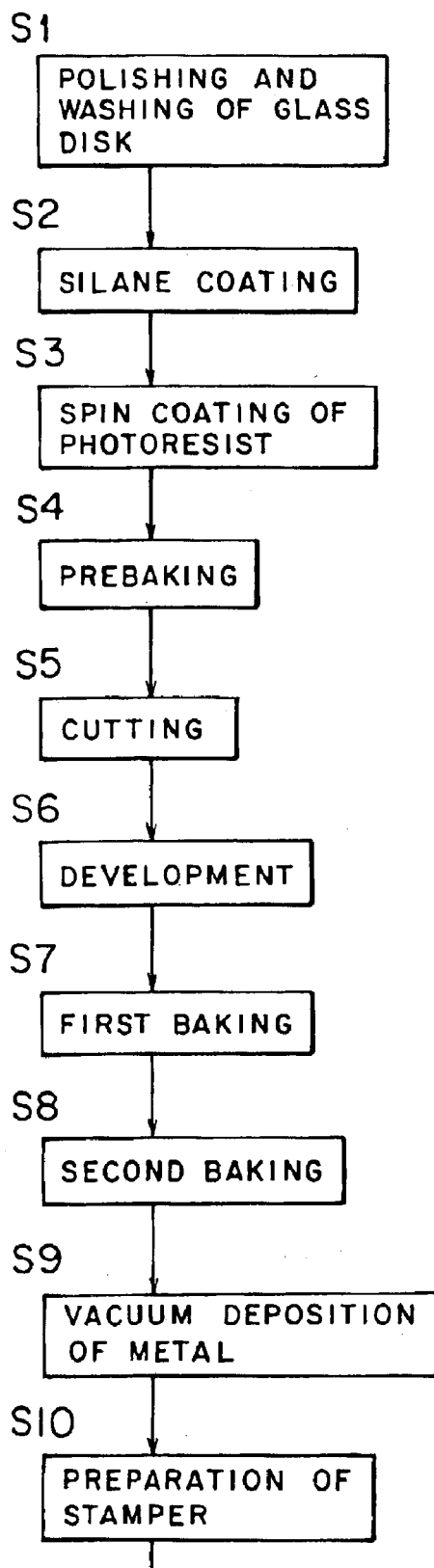
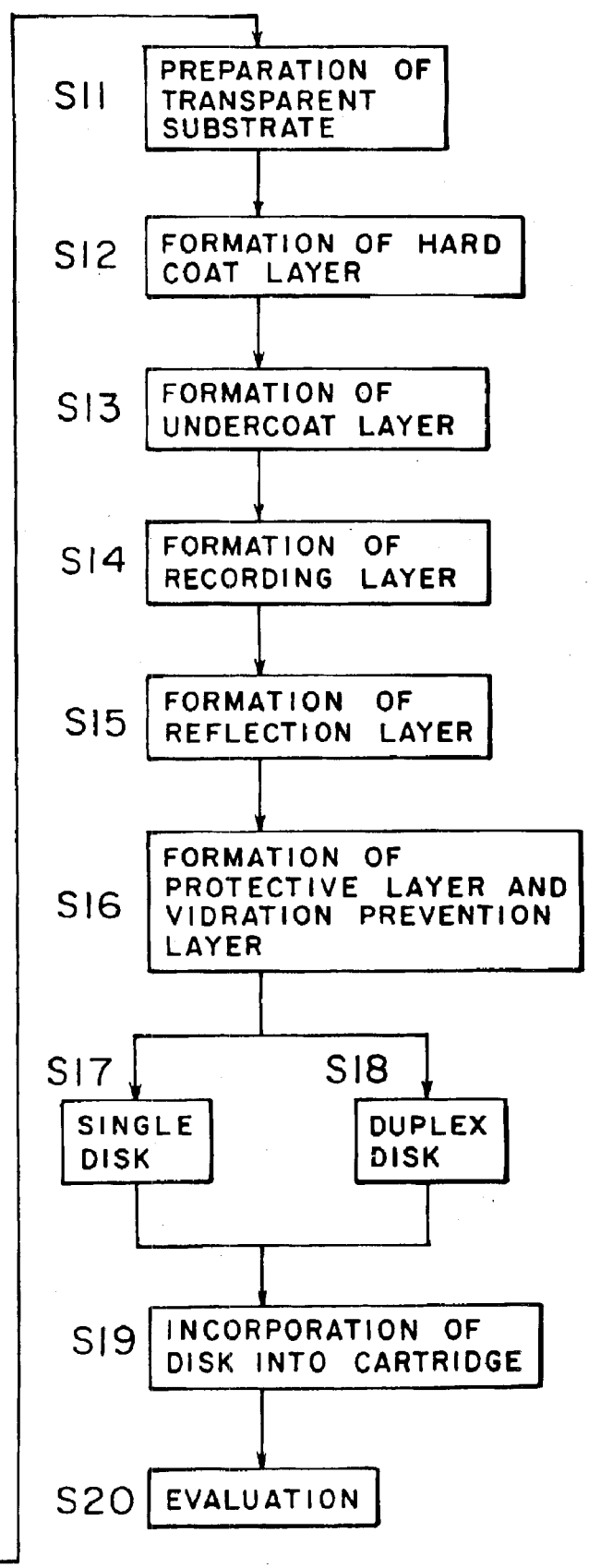

INFORMATION RECORDING MEDIUM

CROSS REFERENCE TO RELATED APPLICATIONS

This application is a continuation of U.S. patent application Ser. No. 10/174,207 filed June 18, 2002, now abandoned which is a continuation of U.S. patent application Ser. No. 09/643,014, filed Aug. 21, 2000, now abandoned.

BACKGROUND OF THE INVENTION

1. Field of the Invention

The present invention relates to an information recording medium capable of recording, reproducing, and deleting information including musical information without deterioration of the tone quality thereof, and also relates to such an information recording medium that is also capable of recording information after deleting previously recorded information.

2. Discussion of Background

Conventionally, musical information is digitally recorded in disk-shaped media, representative examples of which are compact disks (CDs), card-shaped recording media, and stick-shaped recording media. Some experts on audio have confirmed through sensory inspection that even if recording and reproduction are digitally conducted, deterioration of tone quality is inevitably caused by some noise generated by recording and reproduction systems employed.

SUMMARY OF THE INVENTION

It is therefore an object of the present invention to provide an information recording medium capable of recording, reproducing, and deleting information including musical information without deterioration of the tone quality of recorded sound, free of conventional problems, in particular, which is capable of recording sound with high tone quality and reproducing the original recorded sound extremely faithfully, with significant reduction of the generation of noise.

The above object of the present invention can be achieved by an information recording medium comprising a transparent substrate, and a recording layer or a metallic layer formed on the transparent substrate directly or through an undercoat layer, with an amplitude attenuation time of 1 second or less when vibrated in the direction perpendicular to the flat surface of the information recording medium.

In the present invention, the amplitude attenuation time is defined as a period of time (seconds) required for a maximum amplitude of the vibrations of the information recording medium to reduce under the following conditions:

In the case of a disk-shaped information recording medium, one end portion of the information recording medium is firmly fixed at a position which is at a distance of 1.5 cm from an outer peripheral edge toward a center thereof, and a vibration force is applied to an end portion opposite to the fixed end portion with respect to the center of the recording medium, so that the information recording medium is vibrated in the direction perpendicular to the flat surface of the information recording medium in such a manner that the number of vibrations per second is 10 or more, and the period of time required for a maximum amplitude of the vibrations 100 milliseconds after the initiation of the vibrations is reduced by 90% of the maximum amplitude, that is, reduced to 10% of the maximum amplitude, is measured.

In the case of a card-shaped, stick-shaped or other non-disk-shaped information recording medium, the above-mentioned fixing position is set at a position of a 10% length away from one end toward the center thereof in a maximum length of the size of the information recording medium.

In the present invention, the thus measured period of time is defined as the amplitude attenuation time, and the amplitude attenuation time is 1 second or less.

The object of the present invention can also be achieved by an information recording medium comprising a transparent substrate, and a recording layer or a metallic layer formed on the transparent substrate directly or through an undercoat layer, with a vibration frequency attenuation time of 3 seconds or less when vibrated in the direction perpendicular to the flat surface of the information recording medium.

In the present invention, the vibration frequency attenuation time is defined as a period of time (seconds) required for the total number of vibrations within a period of time from 100 millisecond through 200 millisecond after the initiation of the above-mentioned vibrations to reduce by 10% of the above-mentioned total number of vibrations, that is, to reduce to 90%. In the present invention, the thus measured period of time is defined as the vibration frequency attenuation time, and the vibration frequency attenuation time is 3 seconds or less.

The object of the present invention can also be achieved by an information recording medium comprising a transparent substrate, and a recording layer or a metallic layer formed on the transparent substrate directly or through an undercoat layer, with the amplitude attenuation time of 1 second or less and the vibration frequency attenuation time of 3 seconds or less, when vibrated in the direction perpendicular to the flat surface of the information recording medium.

In the above information recording medium, it is preferable that the amplitude attenuation time be in the range of 200 milliseconds to 1 second, or/and that the vibration frequency attenuation time be in the range of 150 milliseconds to 3 seconds.

The transparent substrate of the above information recording medium may be in the shape of a disk and the information recording medium may comprise:

a central hole portion, an inner ring-shaped portion around the central hole portion, and an outer ring-shaped portion comprising the recording layer or the metallic layer around the inner ring-shaped portion, the inner ring-shaped portion having a light transparency of 92% or less with respect to a recording or reproduction light for the information recording medium.

The above information recording medium may further comprise a vibration prevention layer which is overlaid on the surface of the information recording medium on the side of the recording layer for preventing the vibrations of the information recording medium.

The vibration prevention layer may comprise a hydrophilic material, such as polyvinyl pyrrolidone or polyvinyl alcohol, or an ink component.

The vibration prevention layer may also comprise (a) a UV cured ink layer comprising an ink component and (b) a hydrophilic-material layer comprising a hydrophilic material, which are overlaid.

Examples of the hydrophilic material are polyvinyl pyrrolidone and polyvinyl alcohol.

The above-mentioned vibration prevention layer may also be overlaid on both the inner ring-shaped portion and the outer ring-shaped portion, or only on the outer ring-shaped portion, for preventing the vibrations of the information recording medium.

In the above-mentioned information recording medium, it is preferable that the vibration prevention layer be overlaid in a deposition amount of 0.002 g/cm² to 0.040 g/cm².

In the information recording medium, it is preferable that the transparent substrate be produced by injection molding with a cooling time of 5 seconds or more.

The object of the present invention can also be achieved by an information recording medium comprising a transparent substrate, and a recording layer or a metallic layer formed on the transparent substrate directly or through an undercoat layer, including information recording, reproducing and/or deleting tracks along which tracks information can be recorded, reproduced and/or deleted by an information recording, reproducing and/or deleting device, wherein when the information recording medium is in-plane vibrated in the direction perpendicular to the extending direction of the tracks, a maximum in-plane deviation of a recording, reproducing or deleting position in the tracks in the perpendicular direction from a correct recording, reproducing or deleting position in the tracks is 12.5×d or less wherein d is an average distance between the adjoining tracks measured in the direction perpendicular to the extending direction of the tracks, and an acceleration of the information recording medium in the perpendicular direction is 0.25 m/s² or less.

The object of the present invention can also be achieved by an information recording medium comprising a transparent substrate, and a recording layer or a metallic layer formed on the transparent substrate directly or through an undercoat layer, including information recording, reproducing and/or deleting tracks along which tracks information can be recorded, reproduced and/or deleted by an information recording, reproducing and/or deleting device, wherein an in-plane deviation of a recording, reproducing or deleting position in the tracks from a correct recording, reproducing or deleting position in the tracks is monitored by a tracing device for tracing the recording, reproducing or deleting position, a correct recording, reproducing or deleting position is virtually determined by the monitored in-plane deviation, and a maximum in-plane deviation is controlled to be 12.5×d or less wherein d is an average distance between the adjoining tracks measured in the direction perpendicular to the extending direction of the tracks, and an acceleration of the information recording medium in the perpendicular direction is also controlled to be 0.25 m/s² or less.

The transparent substrate of the above information recording medium may be in the shape of a disk and the information recording medium may comprise:

a central hole portion, an inner ring-shaped portion around the central hole portion, and an outer ring-shaped portion comprising the recording layer or the metallic layer around the inner ring-shaped portion, the inner ring-shaped portion having a light transparency of 92% or less with respect to a recording or reproduction light for the information recording medium.

The above information recording medium may further comprise a vibration prevention layer which is overlaid on the surface of the information recording medium on the side of the recording layer for preventing the vibrations of the information recording medium.

The vibration prevention layer may comprise a hydrophilic material, such as polyvinyl pyrrolidone or polyvinyl alcohol, or an ink component.

The vibration prevention layer may also comprise (a) a UV cured ink layer comprising an ink component and (b) a hydrophilic-material layer comprising a hydrophilic material, which are overlaid.

Examples of the hydrophilic material are polyvinyl pyrrolidone and polyvinyl alcohol.

The above-mentioned vibration prevention layer may also be overlaid on both the inner ring-shaped portion and the outer ring-shaped portion, or only on the outer ring-shaped portion, for preventing the vibrations of the information recording medium.

In the above-mentioned information recording medium, it is preferable that the vibration prevention layer be overlaid in a deposition amount of 0.002 g/cm² to 0.040 g/cm².

In the above information recording medium, it is preferable that the transparent substrate be produced by injection molding with a cooling time of 5 seconds or more.

In the above information recording medium, it is preferable that the vibration prevention layer be formed by repeating the step of coating a UV curing material in an amount of 0.004 g/cm² or less and curing the coated UV curing material a plurality of times.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a schematic perspective view of an optical information recording medium No. 5 of the present invention.

FIG. 9 is a flow chart indicating the steps of producing a disk-shaped optical information recording medium of the present invention.

DESCRIPTION OF THE PREFERRED EMBODIMENTS

Other features of this invention will become apparent in the course of the following description of exemplary embodiments, which are given for illustration of the invention and are not intended to be limiting thereof.

EXAMPLE 1-1

Figure 1:
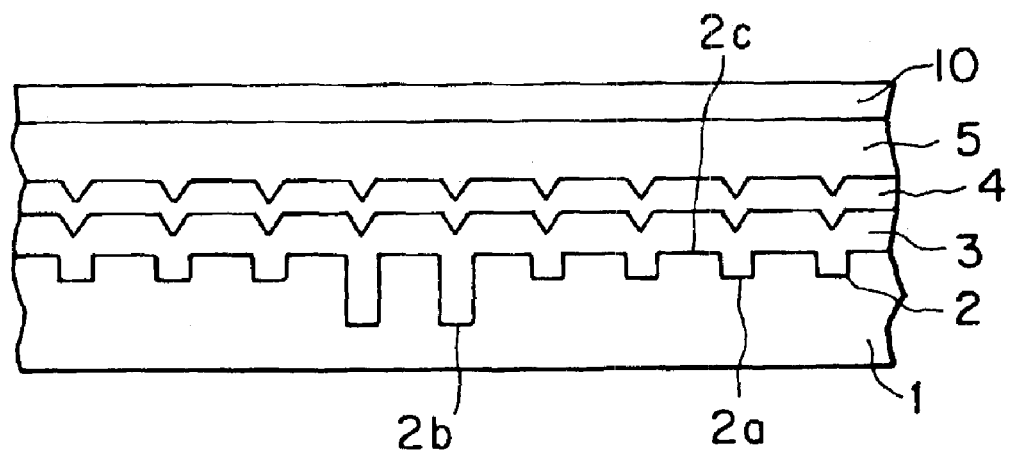
FIG. 1 is a schematic partial enlarged cross-sectional view of an optical information recording medium No. 1-1 of the present invention.
Figure 2:
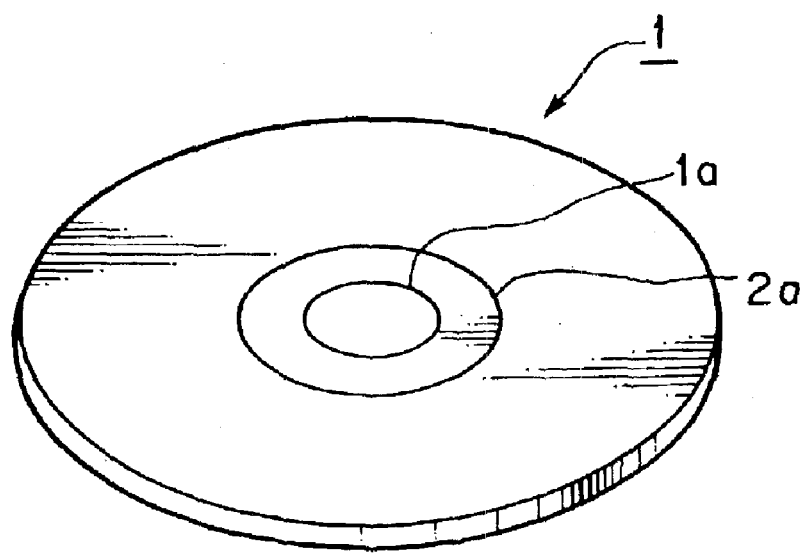
FIG. 2 is a perspective view of the optical information recording medium No. 1-1 of the present invention.

FIG. 1 is a schematic partial enlarged cross-sectional view of an optical information recording medium No. 1-1 of the present invention. FIG. 2 is a perspective view of the optical information recording medium No. 1-1 of the present invention.

As shown in these figures, the optical information recording medium No. 1-1 comprises a transparent substrate 1 with a preformat pattern 2 including grooves and/or pits in a fine concave and convex form on one side thereof, an information recording layer 3 provided on the transparent substrate 1, which is formed by filling the grooves and/or pits in the preformat pattern 2 of the transparent substrate 1 with a recording material, a reflection layer 4 provided on the information recording layer 3, a protective layer 5 provided on the reflection layer 4, and a UV cured ink layer 10 comprising an ink component provided on the protective layer 5.

As the transparent substrate 1, there can be employed conventional transparent substrates such as (1) a transparent substrate made by molding a transparent resin material such as polycarbonate, polymethyl methacrylate, polymethyl pentene, or epoxy resin into a desired shape to form a molded resin substrate, and then transferring a desired preformat pattern to one side of the molded resin substrate, and (2) a transparent substrate made by providing a desired preformat pattern made of a transparent resin layer on one side of a transparent glass or a transparent ceramic plate.

The transparent substrate 1 for a disk-shaped optical information recording medium (hereinafter referred to as an optical disk) is formed in the shape of a disk with a center hole 1a in a central portion thereof as shown in FIG. 2. The transparent substrate 1 can be made by any conventionally known method.

The preformat pattern 2 is constructed so as to include a beam guide portion in order to have at least a recording and reproducing laser beam follow a recording track.

In the optical recording medium No. 1-1 shown in FIGS. 1 and 2, the beam guide portion is formed so as to include a guide groove 2a which is concentric with the center hole 1a or concentrically spiral around the center hole 1a. Prepits 2b such as address pits and clock pits are also formed along the guide groove 2a. When the prepits 2b are formed so as to be superimposed on the guide groove 2a, the guide groove 2a and the prepits 2b are respectively formed with a different depth as shown in FIG. 1 in order to optically distinguish the guide groove 2a and the prepits 2b. When the prepits 2b are formed between the adjoining guide grooves 2a, they can be formed with the same depth. As the beam guide portion, wobble pits can be formed along the recording track instead of the guide groove 2a. Alternatively, the beam guide portion can be formed of the guide groove only, without the prepits 2b.

The information recording layer 3 can be formed by filling the above-mentioned preformat pattern 2 with a recording material capable of absorbing light energy and converting the absorbed light energy into thermal energy, that is, a material with a light-to-heat conversion property, or a heat-mode recording material including at least an ionic dye material having such a light-to-heat conversion property.

Examples of such dye materials by which the information recording layer 3 can be formed are polymethine dye, anthraquinone dye, cyanine dye, phthalocyanine dye, naphthalocyanine dye, xantene dye, triphenylmethane dye, pyrylium dye, azulene dye, metal-containing azo dye, and azo dye. Of these dyes, dicarbocyanine derivative, phthalocyanine derivative, naphalocyanine derivative, cyanine derivative and azo dye derivative are particularly preferable for use in the present invention.

Furthermore, dye materials to which a variety of quenchers, such as aminium dye, are added can also be employed.

Furthermore, a material composed of a resin in which at least one of the above-mentioned dye materials is dispersed can also be used as a material for forming the information recording layer 3.

Examples of resins in which the above-mentioned dye materials can be dispersed are acrylic resin, vinyl resin, phenolic resin, fluoroplastics, silicone resin, polyamide resin, and cellulose resin.

The information recording layer 3 can be formed by spin coating of a solution of any of the above exemplified dye materials in a solvent on a preformat pattern formation surface of the transparent substrate 1.

After the guide grooves 2a in the preformat pattern 2 are filled with the dye material, the dye material which adheres to the land portions 2c between the guide grooves in the preformat patterns 2 is selectively removed, and the surface of the transparent substrate 1 is exposed, so that only the grooves in the preformat patterns 2 are filled with the dye material. Thus, the information recording layer 3 can be formed. As the solvent for the dye material, for example, an alcohol-based solvent, and a cellosolve-based solvent can be employed.

The information recording layer 3 can further contain a chelate material which can assume a bidentate ligand as shown below. Examples of such a chelate material are inorganic acids, dicarboxylic acid, oxycarboxylic acid, dioxy compound, oxyoximes, oxyaldehyde and derivatives thereof, diketones and the like, oxyquinones, tolopolones, N-oxide compound, aminocarboxylic acid and the like, hydroxylamines, oxines, aldimines, oxyazo compound, nitrosonaphtols, triazenes, biurets, formazans and dithizones, biguanide, glyoximes, diamines and the like, hydrazine derivatives, and thioether.

Derivatives including imino group (imide, amide) can also be used in the information recording layer 3.

Furthermore, in addition to the above-mentioned organic materials, there can be employed in the information recording layer 3 phase-change materials which are capable of recording information by changing the arrangement of atoms therein, such as an alloy represented by a general formula of:

A-B-C-Ge—Te, wherein A is at least one element selected from the group consisting of Cu, Ag, Au, Sc, Y, Ti, Zr, V, Nb, Cr, Mo, Mn, Fe, Ru, Co, Rh, Ni, Pd, Hf, Ta, W, Ir, Pt, Hg, B, C, N, P, O, S, Se, Lanthanide elements, Actinide element, alkaline earth metal elements, and inert gas elements; B is at least one element selected from the group consisting of Tl, a halogen element such as I, and alkaline metal element such as Na;

and C is at least one element selected from the group consisting of Sb, Sn, As, Pb, Bi, Zn, Cd, Si, Al, Ga and In.

Alloy materials used in magneto-optical recording materials, for example, alloy materials composed of the above-mentioned metal elements such as Tb, Fe and Co, can also be employed as the material for the information recording layer 3.

There is no particular restriction on the material for use in the reflection layer 4. Metallic materials such as Al, Ag, and Co, alloys comprising as the main component the above-mentioned metals, and dyes such as cyanine dye can be used for the reflection layer 4. In particular, Au and Au-containing alloys comprising as the main component therefor are preferable for use in the reflection layer 4. It is preferable that the content of Au in the above-mentioned Au-containing alloys be 80 to 100 atomic %, more preferably 90 to 100 atomic %. Aluminum can also be used in the reflection layer 4 since it is inexpensive and provides satisfactory results as a light reflection material when used in compact disks.

When the metallic material or the alloy material is used as the material for the reflection layer 4, the reflection layer 4 can be formed by vacuum film formation method, such as sputtering or vacuum deposition. In this case, there can be employed a technique of increasing the reflectivity of a metallic reflection layer by forming a layer with a particular density or in a particular crystallization state by conducting the sputtering with the degree of vacuum in a vacuum chamber being changed, for instance, to about $10^{-5}$ torr.

The protective layer 5 can be made of an inorganic material such as SiO, SiN, AlN, or an organic material such as a photo-setting resin. An inorganic protective layer can be formed by the vacuum film formation method. An organic protective layer can be made of a photo-setting resin film, for example, by spin coating SD1700, SD318, or SD301, made by Dainippon Ink & Chemicals, Incorporated, on the reflection layer 4, and irradiating the photo-setting resin film with resin curing rays.

The thus formed protective layer 5 has a thickness of 10 $\mu$m or less, with a deposition amount of 0.0015 g/cm$^2$ or less.

More specifically, the information recording layer 3 was formed on a polycarbonate substrate with preformat patterns as shown in FIG. 1 and FIG. 2, by conducting spin coating of a solution of phthalocyanine.

On the information recording layer 3, a metal film with a thickness of 100 nm was deposited by sputtering, whereby the reflection layer 4 was formed.

On the reflection layer 4, a protective layer 5 was formed on the reflection layer 4 by providing a 5 $\mu$m thick film of a photo-setting resin (Trademark "SD1700" made by Dainippon Ink & Chemicals, Incorporated) with a thermal conductivity of 1.0 or less.

On the protective layer 5, the UV cured ink layer 10 was formed by depositing a DIC UV ink (made by Dainippon Ink & Chemicals, Incorporated) with a deposition amount of 0.002 g/cm$^2$, whereby the optical information recording medium No. 1-1 of the present invention in the form of a disk was prepared.

The amplitude attenuation time and the vibration frequency attenuation time of the optical information recording medium No. 1-1 of the present invention were measured.

As mentioned above, the amplitude attenuation time and the vibration frequency attenuation time of the optical information recording medium No. 1-1 were measured as follows:

One peripheral portion of the thus prepared optical information recording medium No. 1-1 at a distance of 1.5 cm from the periphery thereof toward the center thereof was fixed, and another peripheral portion of the optical information recording medium on the opposite side of the fixed peripheral portion was vibrated in the direction perpendicular to the flat surface of the substrate of the optical information recording medium No. 1-1 at a vibration frequency of 10 per second.

The amplitude attenuation time was measured by measuring a period of time required for a maximum amplitude of the vibrations of the recording medium 100 ms after the recording medium was vibrated as mentioned above to reduce to 10% of the maximum amplitude.

The vibration frequency attenuation time was measured by measuring a period of time required for the total number of the vibrations of the recording medium in a period of time of 100 ms through 200 ms after the recording medium was vibrated as mentioned above to reduce to 90% of the total number of the above-mentioned vibrations. The results are shown in TABLE 1.

EXAMPLES 1-2 TO 1-11 AND COMPARATIVE EXAMPLES 1 AND 2

Optical information recording media No. 1-2 to No. 1-11 of the present invention and comparative information recording media Nos. 1-1 and 1-2 were prepared in the same manner as that for the optical information recording medium No. 1-1 of the present invention in Example 1-1 except that the deposition amount of the UV cured ink layer 10 was changed as shown in the column of "Deposition amount of UV cured ink layer" in TABLE 1.

Figure 4:
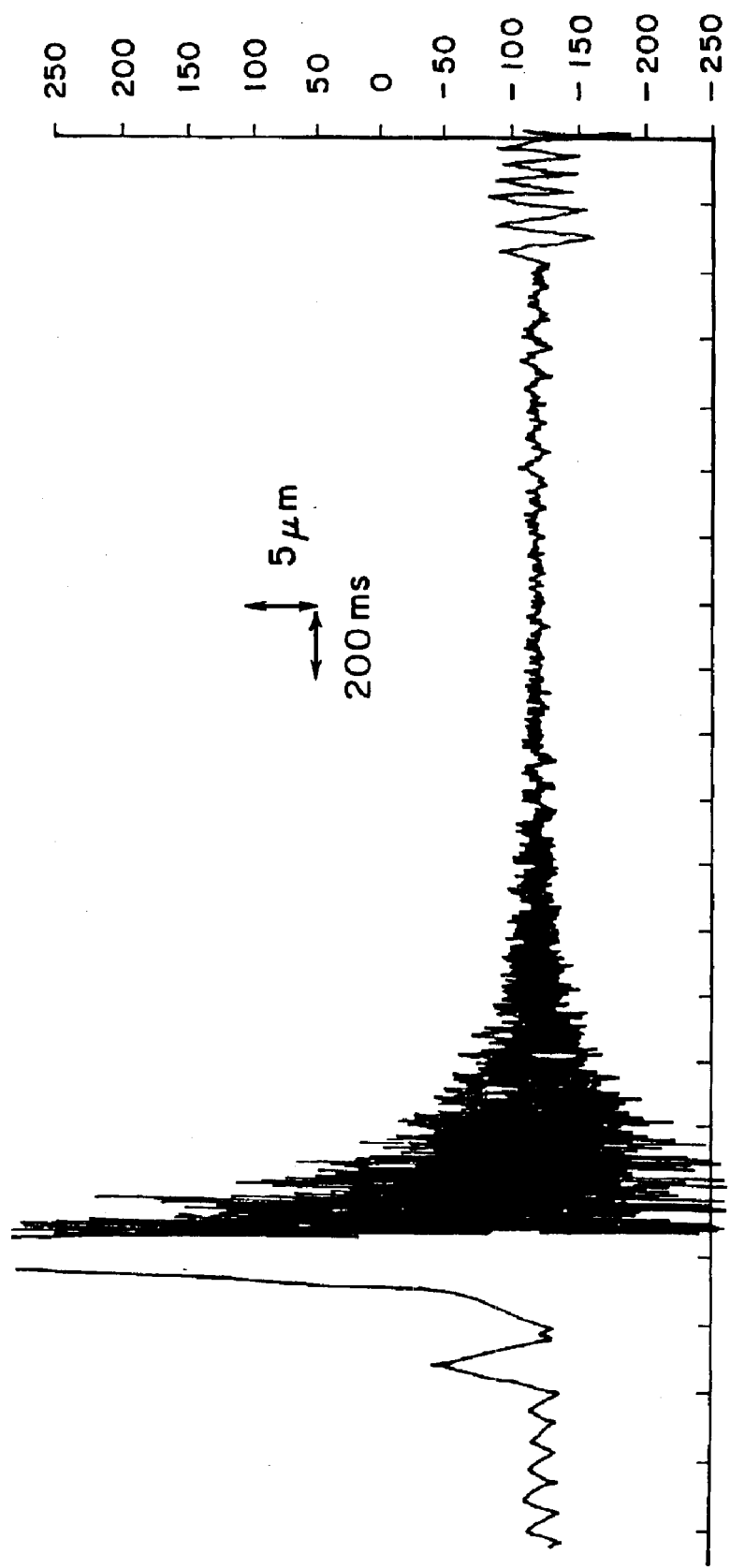
FIG. 4 is a graph showing the vibrations of a representative example of the optical information recording media in Examples 1-1 to 1-11.

FIG. 4 shows a representative example of the vibrations.

TABLE 1 shows the changes in the amplitude attenuation time and the vibration frequency attenuation time of the optical information recording media in accordance with the changes in the deposition amount of the UV cured ink layer 10.

TABLE 1

| Example | Deposition amount of UV cured ink layer (g/cm$^2$) | Amplitude attenuation time (ms) | Vibration frequency attenuation time (ms) |
|---|---|---|---|
| Comp. Ex. 1 | 0 | 1500 | 5000< |
| Comp. Ex. 2 | 0.001 | 1150 | 4500 |
| Ex. 1-1 | 0.002 | 1000 | 3000 |
| Ex. 1-2 | 0.003 | 580 | 820 |
| Ex. 1-3 | 0.004 | 550 | 720 |
| Ex. 1-4 | 0.005 | 300 | 300 |
| Ex. 1-5 | 0.010 | 270 | 270 |
| Ex. 1-6 | 0.020 | 270 | 270 |
| Ex. 1-7 | 0.030 | 280 | 250 |
| Ex. 1-8 | 0.040 | 200 | 150 |
| Ex. 1-9 | 0.050 | 140 | 80 |
| Ex. 1-10 | 0.060 | 90 | 80 |
| Ex. 1-11 | 0.070 | 80 | 60 |

The relationship between the deposition amount of the UV cured ink layer 10 and the noise or the tone quality in each of the above optical information recording media in TABLE 1 was investigated.

When the deposition amount of the UV cured ink layer 10 was 0.040 g/cm$^2$ or more, the load applied by the optical information recording medium disk to a motor for rotating the medium disk was so large that the UV cured ink layer worked so as to tend to cause the tone quality to deteriorate.

When the deposition amount of the UV cured ink layer 10 was in the range of 0.030 g/cm$^2$ to less than 0.040 g/cm$^2$, the noise with a frequency of 10 Hz to 100 Hz was mainly attenuated in a short time, so that the tone quality was good.

When the deposition amount of the UV cured ink layer 10 was in the range of 0.010 g/cm² to less than 0.030 g/cm², the noise with a frequency of about 10 Hz to 1000 Hz disappeared in a relatively short time, so that the tone quality was improved.

When the deposition amount of the UV cured ink layer 10 was in the range of 0.003 g/cm² to less than 0.010 g/cm², the noise with a frequency of about 1000 Hz, which can be most sensitively recognized by the human ears, was effectively removed, so that the tone quality was best.

When the deposition amount of the UV cured ink layer 10 was in the range of 0.002 g/cm² to less than 0.003 g/cm², it took a time to remove noise. However, the tone quality was good.

When the deposition amount of the UV cured ink layer 10 was less than 0.002 g/cm², it took an extremely long time to remove noise in an audible frequency range, and the tone quality deteriorated.

The transparent substrate can be produced by injection molding. When the transparent substrate is produced by injection molding, it is preferable that the substrate be cooled with a cooling time of 5 seconds or more after it is injected from the mold thereof, since by such injection molding, the fluctuations in the direction of the axis of rotation of the substrate, that is, in the direction perpendicular to the flat surface of the recording medium, and any in-plane distortion can be avoided so that the generation of noise can be effectively reduced.

The evaluation as to the generation of noise of the optical information recording media was conducted by an organoleptic test by experts' actually listening to music reproduced by each recording medium.

The degree of the shrinkage of the UV cured resin used in the UV cured ink layer 10 has an effect on the amplitude attenuation time and the vibration frequency attenuation time mentioned above. It is preferable to use a UV cured resin with a small shrinkage for use in the UV cured ink layer 10.

EXAMPLE 2

Figure 5:
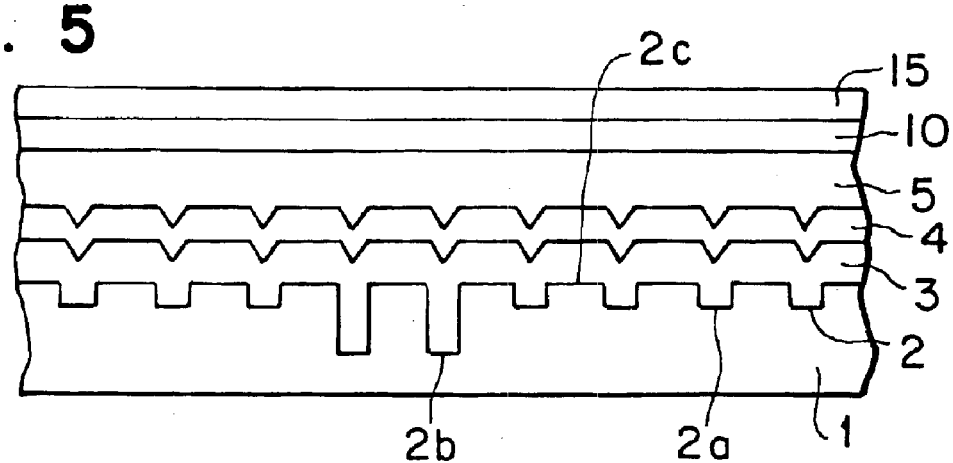
FIG. 5 is a schematic partial enlarged cross-sectional view of an optical information recording medium No. 2 of the present invention.

An optical information recording medium No. 2 of the present invention will now be explained with reference to FIG. 5, which is a schematic partial enlarged cross-sectional view of a main portion of the optical information recording medium No. 2.

The optical information recording medium No. 2 was prepared in the same manner as the optical information recording medium No. 1-1 prepared in Example 1-1 except that a hydrophilic-material-containing layer 15 comprising a hydrophilic material was overlaid on the UV cured ink layer 10.

As the hydrophilic material for use in the layer 15, for example, polyvinyl pyrrolidone and polyvinyl alcohol can be employed.

The hydrophilic-material-containing layer 15 may also contain an extender pigment in addition to the hydrophilic material.

The total weight of the UV cured ink layer 10 and the hydrophilic-material-containing layer 15 was adjusted to the same deposition amount of the UV cured ink layer 10 as in Examples 1-1 to 1-11, whereby optical information recording media Nos. 2-1 to 2-11 were prepared, which are collectively referred to as the optical information recording medium No. 2. The tone characteristics of the optical information recording medium No. 2 exhibited the same tendency as those of the optical information recording media Nos. 1-1 to 1-11.

The UV cured ink layer 10 and the hydrophilic-material-containing layer 15 can be formed individually or in combination so as to cover not only the outer ring-shaped portion comprising the recording layer, but also the inner ring-shaped portion corresponding to a clamping area for the optical information recording medium No. 2, whereby the leakage of a laser beam from inside a recording and reproducing apparatus can be completely cut.

The leakage of the laser beam can be cut, not only by shielding the inner ring-shaped portion corresponding to the clamping area for the optical information recording medium No. 2 with a colored layer as mentioned above, but also by roughening the surface of the inner ring-shaped portion so as to have a light transparency of 92% or less, whereby the tone quality can be significantly improved.

The UV cured ink layers 10 or the hydrophilic-material-containing layers 15, for instance, with a deposition amount of 0.0065 g/cm², can be formed, for instance, by coating with a deposition amount of 0.0013 g/cm², followed by curing the coated layer, and again coating the cured layer with a deposition amount of 0.0013 g/cm², and curing the coated layer. A series of these steps are repeated until the total deposition amount amounts to 0.0065 g/cm². When the deposition amount for the first coating is more than 0.0040 g/cm², it takes a long period of time for the curing the coated layer, so that the productivity is lowered. Therefore, it is preferable that a UV coating material be coated in an amount of 0.0040 g/cm² or less at each coating thereof, followed by curing thereof. When the productivity is not a problem, the deposition amount for each coating can be more than 0.0040 g/cm².

EXAMPLE 3

An optical information recording medium No. 3 of the present invention will now be explained with reference to FIG. 6, which is a schematic partial enlarged cross-sectional view of a main portion of the optical information recording medium No. 3.

Figure 6:
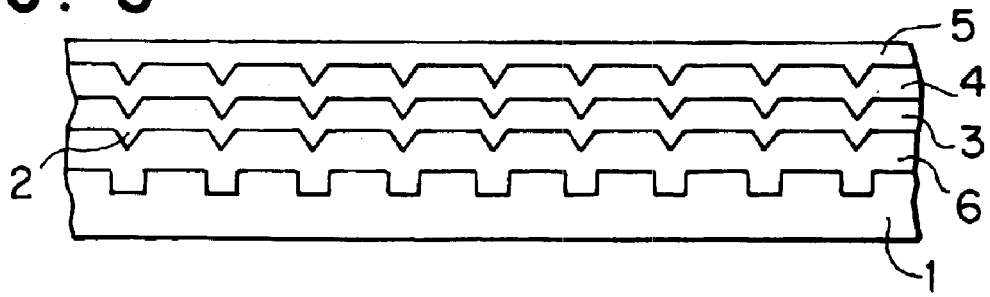
FIG. 6 is a schematic partial enlarged cross-sectional view of an optical information recording medium No. 3 of the present invention.

As shown in FIG. 6, the optical recording medium No. 3 comprises a transparent substrate 1 with a preformat pattern formation surface on one side thereof, an undercoat layer 6 which is formed on the side of the preformat pattern formation surface of the transparent substrate 1, thereby forming a preformat pattern 2 on the undercoat layer 6, an information recording layer 3 formed on the undercoat layer 6 with the grooves of the preformat pattern 2 being filled with a recording material comprising a dye material, a reflection layer 4 formed on the information recording layer 3, a protective layer 5 coated on the reflection layer 4, and a UV cured ink layer 10 formed on the protective layer 4, The transparent substrate 1, the information recording layer 3, the reflection layer 4, the protective layer 5 and the UV cured ink layer 10 in the above optical recording medium No. 3 are respectively the same as those in the optical recording medium No. 1in Example 1, whereby optical information recording media Nos. 3-1 to 3-11 were prepared, which are collectively referred to as optical information recording medium No. 3.

The undercoat layer 6 is provided to improve the adhesion between the transparent substrate 1 and the information recording layer 3 and also to improve the recording sensitivity of the recording medium. The undercoat layer 6 serves to protect the information recording layer 3.

The undercoat layer 6 can be made of, for example, a hydrophilic resin such as polyvinyl alcohol, polyethylene oxide, polyacrylic acid, sodium polystyrenesulfonate, polyvinyl pyrrolidone, polymethacrylic acid, polypropylenen glycol, methyl cellulose, polyvinyl nitrate, and nitro cellulose.

The undercoat layer 6 can be formed by conducting spin coating, using an aqueous solution of any of the above-mentioned hydrophilic resins, on the preformat pattern formation surface of the transparent substrate 1.

When the undercoat layer 6 is made of the hydrophilic resin, the water resistance including moisture resistance and moisture penetration resistance, and the heat resistance thereof are poor, so that it is preferable that the water resistance and the heat resistance of the undercoat layer 6 be improved by subjecting the undercoat layer 6 to cross-linking treatment and crystallization treatment. More specifically, in this case, it is preferable that the undercoat layer 6 be formed, using an aqueous solution of the hydrophilic resin with the addition of a cross-linking agent thereto, and a cross-linking reaction be caused to take place in the undercoat layer 6 with light irradiation or with the application of heat to the undercoat layer 6. Alternatively, an undercoat layer 6 free of cross-linking agent, is subjected to heat treatment to crystallize the undercoat layer 6. For example, when polvinyl alcohol (PVA) is used as the hydrophilic resin, it is preferable that the PVA be modified to a modified PVA.

When the cross-linking treatment and the crystallization treatment are compared, the cross-linking treatment is considered to be better than the crystallization treatment, since the cross-linking treatment has no adverse thermal effects on the transparent substrate 1, and the operating efficiency thereof is better than that of the crystallization treatment.

The following are specific examples of cross-linking treatment methods:
(1) A cross-linking treatment method comprising the steps of adding ammonium dichromate as a cross-linking agent to the aqueous solution of the hydrophilic resin for the formation of the undercoat layer 6, forming the undercoat layer 6, and irradiating the undercoat layer 6 with reaction light, thereby cross-linking the undercoat layer 6.
(2) A cross-linking treatment method using as an inorganic cross-linking agent, for example, copper, boron, aluminum, titanium, zirconium, tin, vanadium, or chromium.
(3) A cross-linking treatment method of forming acetal using aldehyde.
(4) A cross-linking treatment method of changing hydroxyl group to aldehyde group.
(5) A cross-linking treatment method, with the addition of an activated vinyl compound.
(6) A cross-linking treatment method, using etherification with the addition of an epoxy compound.
(7) A cross-linking treatment method, using a reaction of dicarboxylic acid in the presence of an acid catalyst.
(8) A cross-linking treatment method, with the addition of succinic acid and sulfuric acid.
(9) A cross-liking treatment method, with the addition of triethylene glycol and methyl acrylate.
(10) A cross-liking treatment method, with the blending of polyacrylic acid and methyl vinyl ether-maleic acid copolymer.

In the optical information recording medium No. 3 of the present invention, as the hydrophilic resin for the undercoat layer 6, polyvinyl alcohol was employed, and the undercoat layer 6 was formed by spin coating, using a 2.0 wt. % aqueous solution of polyvinyl alcohol and chromium as the cross-linking agent.

Thus, the optical information recording medium No. 3 of the present invention was prepared.

The tone characteristics of the optical information recording medium No. 3 exhibited the same tendency as those of the optical information recording media Nos. 1-1 to 1-11.

EXAMPLE 4

An optical information recording medium No. 4 of the present invention will now be explained with reference to FIG. 7, which is a schematic partial enlarged cross-sectional view of a main portion of the optical information recording medium No. 4.

Figure 7:
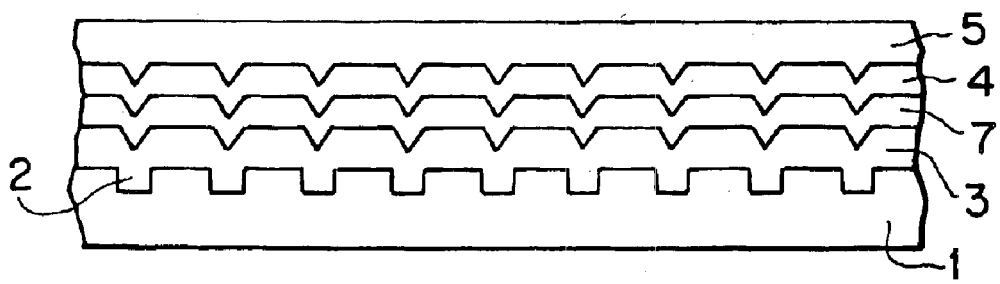
FIG. 7 is a schematic partial enlarged cross-sectional view of an optical information recording medium No. 4 of the present invention.

As shown in FIG. 7, the optical recording medium No. 4 comprises a transparent substrate 1 with a preformat pattern 2 on one side thereof, an information recording layer 3 which is formed by filling the grooves of the preformat pattern 2 of the transparent substrate 1 with a recording material comprising a dye, an intermediate layer 7 formed on the information recording layer 3, a reflection layer 4, a protective layer 5 formed on the reflection layer 4, and a UV cured ink layer 10 formed on the protective layer 5.

The transparent substrate 1, the information recording layer 3, the reflection layer 4, the protective layer 5 and the UV cured ink layer 10 in the above optical recording medium No. 4 are respectively the same as those in the optical recording media Nos. 1-1 to 1-11 in Examples 1-1 to 1-11, whereby optical information recording media Nos. 4-1 to 4-11 were prepared, which are collectively referred to as the optical information recording medium No. 4. The tone characteristics of the optical information recording medium No. 4 exhibited the same tendency as those of the optical information recording media Nos. 1-1 to 1-11.

The intermediate layer 7 is provided to improve the adhesion between the information recording layer 3 and the reflection layer 4 and also to improve the recording sensitivity of the optical information recording medium No. 4. The intermediate layer 7 is also provided to protect the information recording layer 3 and can comprise a hydrophilic resin of the same kind as that of the hydrophilic resin employed in the undercoat layer 6 of the optical information recording media No. 3 in Example 3, or an electron-donating or electron-accepting material for a redox reaction of a metallic reflection film.

When the hydrophilic resin is selectively employed in the intermediate layer 7, the intermediate layer 7 can be formed by spin coating of an aqueous solution of the hydrophilic resin on the information recording layer 3.

It is preferable that the intermediate layer 7 formed by the spin coating be subjected to the cross-linking treatment or the crystallization treatment mentioned in Example 3 in order to improve the water resistance and the heat resistance of the intermediate layer 7.

EXAMPLE 5

Figure 8:
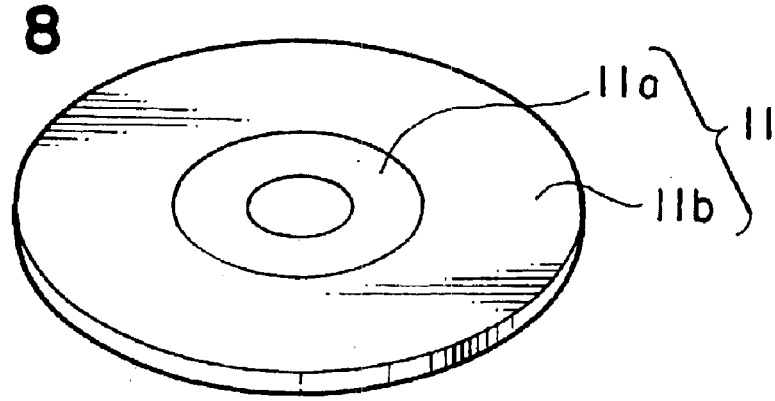

FIG. 8 is a perspective view of an optical information recording medium No.5 of the present invention, which is a so-called partial ROM type optical information recording medium comprising an information recording area 11. As shown in FIG. 8, the information recording area 11 includes a ROM area 11a and a write-once-read-many area 11b which is hereinafter referred to as WORM area 11b.

In the ROM area 11a, beam guide portions, header portions, and read-only information signals are formed in the form of prepits as preformat pattern 2 (not shown).

On the other hand, in the WORM area 11b, only beam guide portion and header portions are formed as preformat pattern 2 (not shown). Unrecorded portions between the header portions which are arranged at predetermined constant intervals on a track constitute write-once-read-many areas for information.

The WORM area 11b can be formed in the same manner as in the optical information recording medium No. 1 prepared in Example 1, or in the optical information recording medium No. 2 prepared in Example 2, or in the optical information recording medium No. 3 prepared in Example 3.

The transparent substrate 1, the information recording layer 3, the reflection layer 4, the protective layer 5 and the UV cured ink layer 10 in the above optical information recording medium No. 5 are respectively the same as those in the above-mentioned optical recording media Nos. 1 to 3 prepared in Examples 1 to 3.

A printed layer (not shown) can also be formed on the external surface of the optical information recording medium No. 5.

It was confirmed that the WORM area 11b exhibited the same excellent recording and reproduction characteristics as those of the above-mentioned optical information recording media.

It was also confirmed that the ROM area 11a exhibited excellent reproduction characteristics when reproduction was carried out, using a drive apparatus made in accordance with the CD or DVD standards.

FIG. 9 is a flow chart indicating the steps of producing the disk-shaped optical information recording medium of the present invention.
S1: Polishing and washing of a glass disk
S2: Coating the polished and washed surface of the glass disk with silane
S3: Spin coating of the glass disk with a photoresist, thereby forming a resist layer with a predetermined thickness on the glass disk
S4: Prebaking the resist layer to remove a solvent therefrom
S5: Exposing the resist layer to a laser beam irradiation through a condenser lens, thereby conducting cutting
S6: Subjecting the exposed glass disk to development treatment
S7: Heating the resist layer to a temperature above Tg thereof to making formed grooves neat, thereby conducting first baking
S8: Baking the resist layer for solidifying a pattern, thereby conducting second baking
S9: Conducting vacuum deposition of a metal
S10: Forming a metallic film on the concave and convex surface of the glass disk, and peeling the metallic film off the glass disk, thereby forming a stamper
S11: Making a transparent substrate with a predetermined thickness with a preformat pattern by conducting injection molding, using the stamper
S12: Forming a hard coat layer on one side of the transparent substrate opposite to the preformat pattern by spin coating
S13: Forming an undercoat layer on the preformat pattern of the transparent substrate by spin coating
S14: Forming a recording layer on the undercoat layer by spin coating
S15: Forming a reflection layer on the recording layer by spin coating
S16: Forming a protective layer and a vibration prevention layer on the reflection layer by spin coating
S17: When used in the form of a single disk
S18: When used in the form of a duplex disk by sticking two disks together
S19: Incorporating the disk into a cartridge
S20: Evaluating the performance and characteristics of the disk In this flow chart, the steps S7 and S8 can be conducted at the same time. The shape of the grooves can be made neat by heating the grooves at 90° C. to 180° C. for 5 to 90 minutes.

Figure 10:
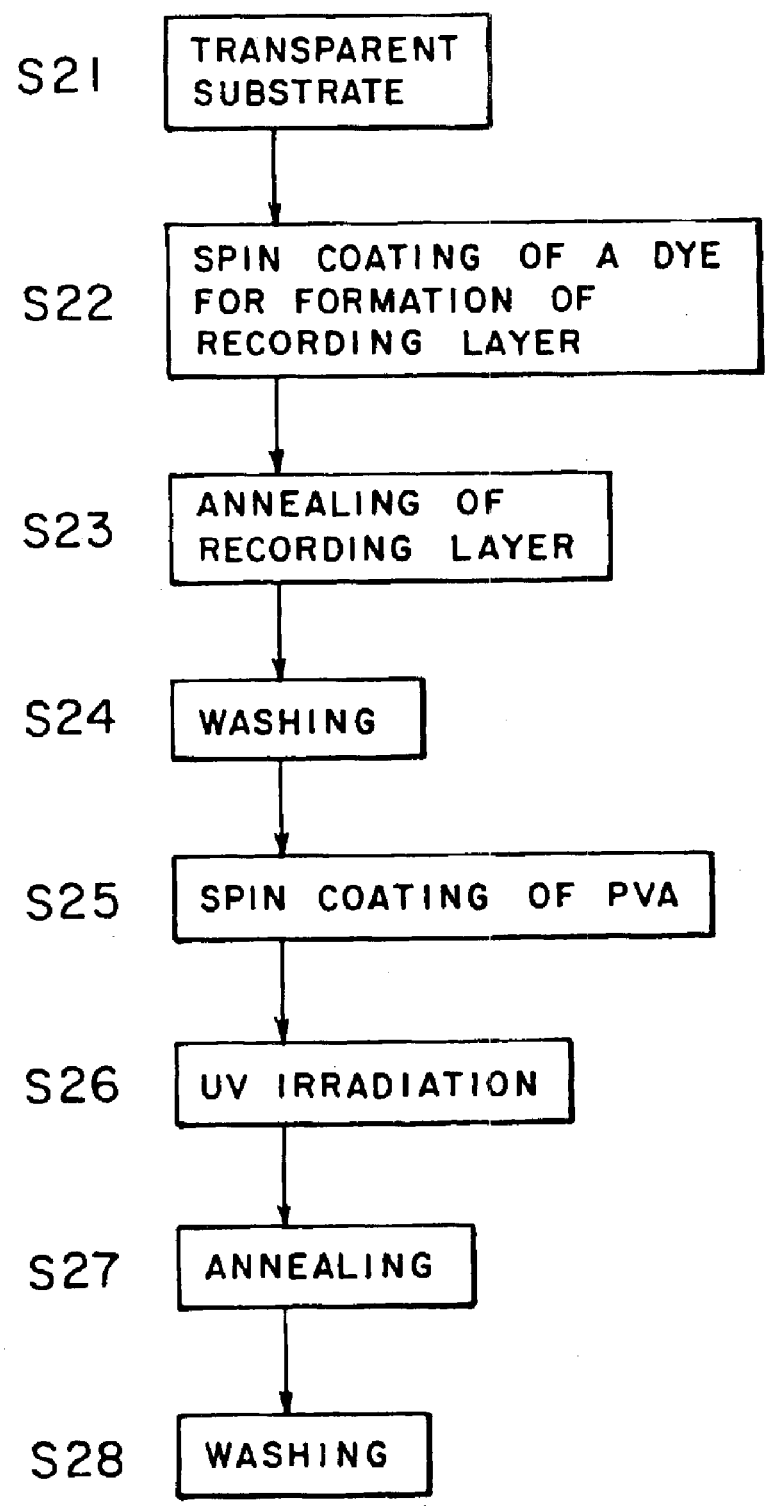
FIG. 10 is a flow chart describing the details of the steps for forming a recording layer and an intermediate layer in the flow chart in FIG. 9.

FIG. 10 is a flow chart describing the details of the steps for forming the recording layer and an intermediate layer in the flow chart in FIG. 9.
S21: Preparing a disk-shaped substrate provided with the undercoat layer (which may be omitted)
S22: Forming the recording layer on the substrate by spin coating of an alcohol solution or a cellosolve solution of any of a phthalocyanine dye, a metal-containing azo dye or a cyanine dye, and an infrared absorbing dyestuff
S23: Annealing the recording layer at 30° C. to 140° C. for 10 seconds or more to evaporate an excessive solvent therefrom
S24: Washing the surface of the dyestuff film, in particular, to remove an excessive dyestuff from an external peripheral portion thereof
S25: Coating the surface of the recording layer with a solution of polyvinyl alcohol (PVA) and a cross-linking agent by spin coating
S26: Irradiating the PVA coated layer with ultraviolet rays for 1 second or more to cross-link the PVA
S27: Annealing the coated layer at 30° C. to 140° C. for 10 seconds or more to evaporate an excessive solvent therefrom after the cross-linking
S28: Spin coating of water or the like on the cross-linked PVA coated layer to remove an excessive cross-linking agent therefrom by washing, thereby forming an intermediate layer

EXAMPLE 6

Figure 11:
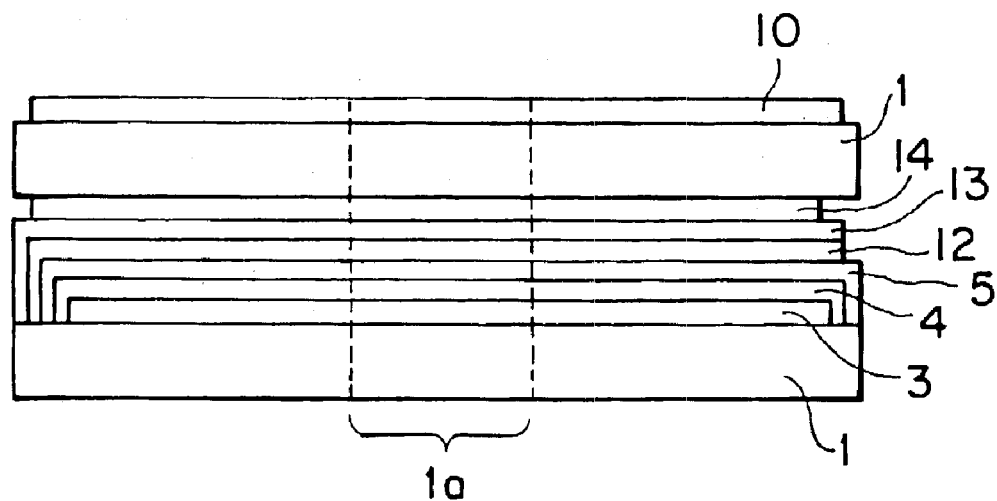
FIG. 11 is a schematic partial enlarged cross-sectional view of an optical information recording medium No. 6 of the present invention.

An optical information recording medium No. 6 of the present invention will now be explained with reference to FIG. 11, which is a schematic partial enlarged cross-sectional view of the optical information recording medium No. 6. The optical information recording medium No. 6 is such a structure that two substrates 1 are stuck together.

More specifically, on the protective layer 5, an adhesive layer 12 is overlaid. A second substrate 1' is overlaid on the protective layer 12 through a first intermediate layer 13 and a second intermediate layer 14.

The water-soluble resin used in the above-mentioned undercoat layer and intermediate layer, and the metallic material used in the above-mentioned reflection layer can also be used in the above-mentioned first intermediate layer 13 and second intermediate layer 14.

On the thus prepared medium, the UV cured ink layer 10 was overlaid with the same deposition amount as in Examples 1-1 to 1-11, whereby the optical information recording media No. 6-1 to 6-11 of the present invention were prepared. The optical information recording media No. 6-1 to 6-11 are collectively referred to as the optical information recording medium No. 6.

The recording and reproduction characteristics of the optical information recording medium No. 6 were the same as those of the optical information recording media No. 1-1 to No. 1-11 prepared in Examples 1-1 to 1-11.

EXAMPLE 7

The procedure of preparing the optical information recording medium No. 1-1 in Example 1-1 was repeated except that the deposition amount of the UV cured ink layer 10 was changed from 0.002 g/cm² to 0.0067 g/cm², whereby an optical information recording medium No. 7 of the present invention was prepared.

In the optical information recording medium No. 7, were formed information recording, reproducing and/or deleting tracks along which tracks information can be recorded, reproduced and/or deleted by an information recording, with an average distance between the adjoining tracks measured in the direction perpendicular to the extending direction of the tracks being 1.6 μm.

Based on the thus prepared optical information recording medium No. 7, 16 samples of the recording media with a radial in-plane deviation in the radial direction thereof being in the range of 4 μm to 30 μm, which is the so-called radial run-out (O-P) of 4 μm to 30 μm, when rotated.

The radial run-out of each of the thus prepared 16 samples of the disk-shaped recording media was measured by a commercially available radial run-out device (Trademark "LM1200" made by Ono-soku Co., Ltd.).

By the measurement of the radial run-out of each of the sample, using the above device, it was confirmed that the average distance between the adjoining tracks was 1.6 μm, and that the radial run-out (O-P) of the samples was in the range of 4 μm to 30 μm as designed.

More specifically, by use of a tracing device for tracing an information recording, reproducing or deleting position in the track, an in-plane deviation of a pick-up device is monitored, and from the monitored in-plane deviation, a correct recording, reproducing or deleting position was virtually determined, whereby a maximum in-plane deviation of the recording, reproducing or deleting position was determined. The result was that the radial run-out (O-P) of the samples was in the range of 4 μm to 30 μm as designed.

The accelerations of the samples in the radial direction varied in the range of 0.045 m/s² to 0.358 m/s².

Figure 3:
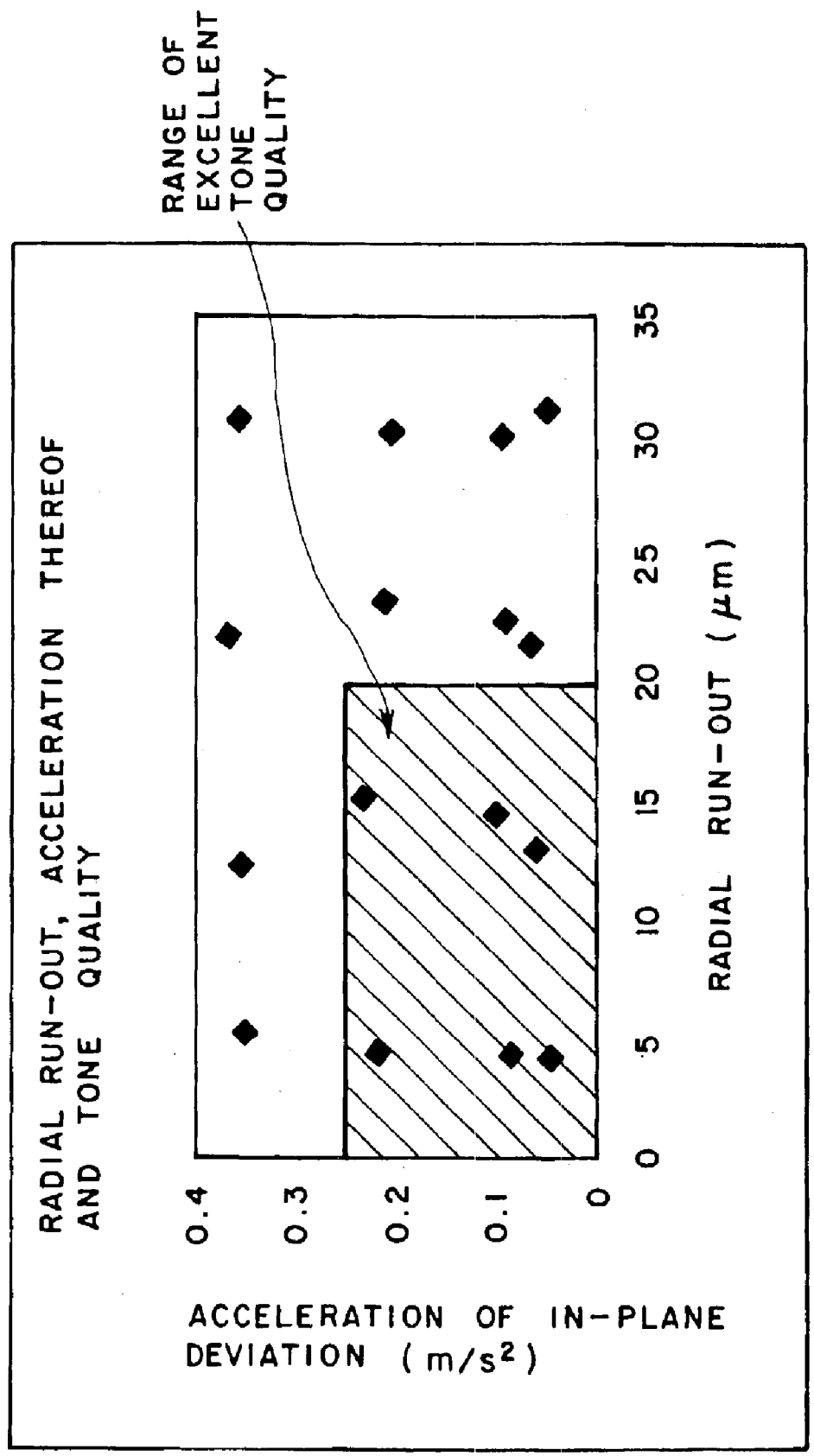
FIG. 3 is a diagram in explanation of the relationship among the radial run-out, the acceleration of the radial run-out, and the tone quality obtained in 16 samples of the optical information recording media in Example 7.

Audio information was recorded in these samples by use of CD W900E made by Sony Corp. The tone quality of each sample was evaluated by 4 experts in this field. The result was that excellent tone quality was obtained when the radial run-out was 20 μm or less, and the acceleration of the in-plane deviation was 0.25 m/s² or less as shown in FIG. 3.

The relationship between the magnitude of the in-plane deviation and the number of vibrations in terms of the in-plane deviation were analyzed. The result was that such an information recording medium that the magnitude the in-plane deviation thereof becomes maximum (12.5×d) at a minimum number of vibrations per unit time in terms of the in-plane deviation exhibited excellent tone quality.

EXAMPLE 8

Figure 12:
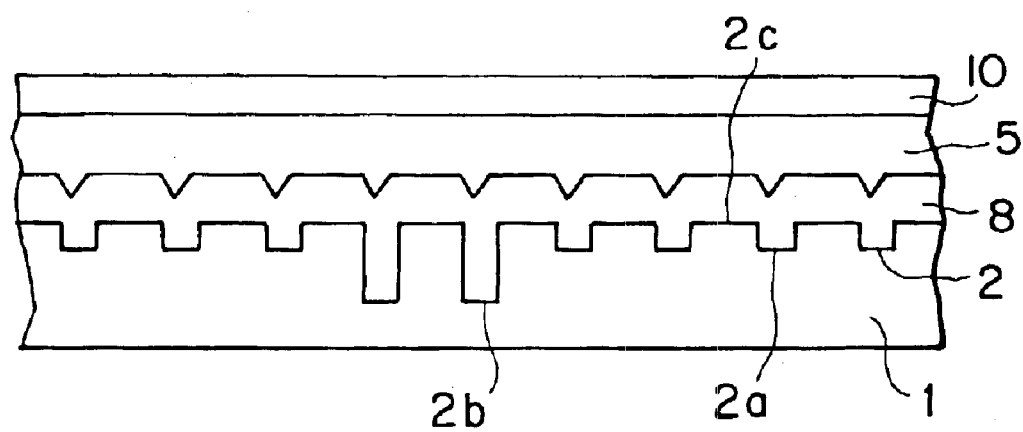
FIG. 12 is a schematic partial enlarged cross-sectional view of an optical information recording medium No. 8 of the present invention.

An optical information recording medium No.8 of the present invention will now be explained with reference to FIG. 12, which is a schematic partial enlarged cross-sectional view of a main portion of the optical information recording medium No. 8.

The optical information recording medium No.8 was prepared in the same manner as the optical information recording medium No. 1-1prepared in Example 1-1 except that the information recording layer 3 and the reflection layer 4 were replaced by a metallic layer 8 made of aluminum which was formed on the preformat pattern of the transparent substrate 1, whereby optical information recording media Nos. 8-1 to 8-11 were prepared, which are collectively referred to as the optical information recording medium No. 8.

There is no particular restriction on the material for the metallic layer 8, but any of the metals employed for the reflection layer 4 in the above-mentioned optical information recording media can be used. The metallic layer 8 can also be formed by the same film formation method as that for the formation of the reflection layer 4.

The tone characteristics of the optical information recording medium No. 8 exhibited the same tendency as those of the optical information recording media Nos. 1-1 to 1-11.

The optical information recording media Nos. 1-1 to No. 8 respectively prepared in Examples 1-1 to 8 are all disk-shaped. However, the present invention is not limited to such disk-shaped optical information recording media, but may be card-shaped, stick-shaped, tape-shaped, or in other shapes.

Furthermore, in the above, the effects of the vibrations in the direction perpendicular to the flat surface of the substrate of the recording medium on the tone quality were investigated. Obviously, the vibrations in the in-plane direction of the recording medium and the eccentricity of the recording medium also has adverse effects on the tone quality or the generation of noise.

According to the present invention, the vibrations in the in-plane direction of the recording medium and the eccentricity of the recording medium can also be reduced and therefore noise generated by such vibrations and the eccentricity can be effectively reduced.

Japanese Patent Application No. 11-234095, filed Aug. 20, 1999, is hereby incorporated by reference.

What is claimed is:

1. An information recording medium comprising a transparent substrate, and a recording layer or a metallic layer formed on said transparent substrate directly or through an undercoat layer, with an amplitude attenuation time of no greater than 580 ms when vibrated in the direction perpendicular to the flat surface of said information recording medium.

2. An information recording medium comprising a transparent substrate, and a recording layer or a metallic layer formed on said transparent substrate directly or through an undercoat layer, with a vibration frequency attenuation time of 3seconds or less when vibrated in the direction perpendicular to the flat surface of said information recording medium.

3. An information recording medium comprising a transparent substrate, and a recording layer or a metallic layer formed on said transparent substrate directly or through an undercoat layer, with an amplitude attenuation time of 1second or less and a vibration frequency attenuation time of 3seconds or less, when vibrated in the direction perpendicular to the flat surface of said information recording medium.

4. The information recording medium as claimed in claim 1, wherein said amplitude attenuation time is in a range of 200 milliseconds to 580 ms.

5. The information recording medium as claimed in claim 2, wherein said vibration frequency attenuation time is in a range of 150 milliseconds to 3seconds.

6. The information recording medium as claimed in claim 3, wherein said amplitude attenuation time is in a range of 200 milliseconds to 1second.

7. The information recording medium as claimed in claim 3, wherein said vibration frequency attenuation time is in a range of 150 milliseconds to 3seconds.

8. The information recording medium as claimed in claim 3, wherein said amplitude attenuation time is in a range of 200 milliseconds to 1second and said vibration frequency attenuation time is in a range of 150 milliseconds to 3seconds.

9. The information recording medium as claimed in claim 1, wherein said transparent substrate is in the shape of a disk comprising:

a central hole portion, an inner ring-shaped portion around said central hole portion, and an outer ring-shaped portion comprising said recording layer or said metallic layer around said inner ring-shaped portion, said inner ring-shaped portion, said inner ring-shaped portion having a light transparency of 92% or less with respect to a recording or reproduction light for said information recording medium.

10. The information recording medium as claimed in claim 1, further comprising a vibration prevention layer which is overlaid on the surface of said information recording medium on the side of said recording layer for preventing the vibrations of said information recording medium.

11. The information recording medium as claimed in claim 2, further comprising a vibration prevention layer which is overlaid on the surface of said information recording medium on the side of said recording layer for preventing the vibrations of said information recording medium.

12. The information recording medium as claimed in claim 3, further comprising a vibration prevention layer which is overlaid on the surface of said information recording medium on the side of said recording layer for preventing the vibrations of said information recording medium.

13. The information recording medium as claimed in claim 10, wherein said vibration prevention layer comprises a hydrophilic material.

14. The information recording medium as claimed in claim 11, wherein said vibration prevention layer comprises a hydrophilic material.

15. The information recording medium as claimed in claim 12, wherein said vibration prevention layer comprises a hydrophilic material.

16. The information recording medium as claimed in claim 13, wherein said hydrophilic material is selected from the group consisting of polyvinyl pyrrolidone and polyvinyl alcohol.

17. The information recording medium as claimed in claim 14, wherein said hydrophilic material is selected from the group consisting of polyvinyl pyrrolidone and polyvinyl alcohol.

18. The information recording medium as claimed in claim 15, wherein said hydrophilic material is selected from the group consisting of polyvinyl pyrrolidone and polyvinyl alcohol.

19. The information recording medium as claimed in claim 10, wherein said vibration prevention layer comprises an ink component.

20. The information recording medium as claimed in claim 11, wherein said vibration prevention layer comprises an ink component.

* * * * *